United States Patent [19]
Fujiwara et al.

[11] Patent Number: 5,842,207
[45] Date of Patent: Nov. 24, 1998

[54] METHOD FOR STORING RECORDS OF A DISTRIBUTED DATABASE BY PLURAL PROCESSORS TO PROVIDE A HOST PROCESSOR WITH SORTED RECORDS BELONGING TO ONE OF A PLURALITY OF KEY SECTIONS

[75] Inventors: Shinji Fujiwara, Kokubunji; Yooichi Shintani, Machida; Mitsuru Nagasaka, Kodaira; Naoki Hamanaka, Tokyo; Mikiko Suzuki, Kunitachi, all of Japan

[73] Assignee: Hitachi, Ltd., Tokyo, Japan

[21] Appl. No.: 911,617

[22] Filed: Jul. 10, 1992

[30] Foreign Application Priority Data

Jul. 10, 1991 [JP] Japan ............................ 3-169661

[51] Int. Cl.$^6$ .................................................... G06F 17/30
[52] U.S. Cl. .................................................. 707/7; 707/10
[58] Field of Search ........................... 395/600, 650; 364/246.3, 252.3, 252.4, 280.6, 281, 281.3, 281.4, 281.6, 282.1, 282.3, 282.4

[56] References Cited

U.S. PATENT DOCUMENTS

| | | | |
|---|---|---|---|
| 3,611,316 | 10/1971 | Woodrum | 395/800 |
| 4,575,798 | 3/1986 | Lindstrom et al. | 123/643 |
| 4,760,526 | 7/1988 | Takeda et al. | 707/7 |
| 4,817,050 | 3/1989 | Komatsu et al. | 707/10 |
| 5,058,002 | 10/1991 | Nakamura et al. | 707/1 |
| 5,146,590 | 9/1992 | Lorie et al. | 707/7 |
| 5,179,699 | 1/1993 | Iyer et al. | 707/7 |
| 5,230,047 | 7/1993 | Frey, Jr. et al. | 395/182.02 |

FOREIGN PATENT DOCUMENTS

| | | |
|---|---|---|
| 0127753 | 12/1984 | European Pat. Off. . |
| 0377993 | 7/1990 | European Pat. Off. . |
| A-2-118756 | of 0000 | Japan . |
| A-2-228730 | of 0000 | Japan . |

OTHER PUBLICATIONS

Ullman, translated by Kunii et al., "Principle of Database System", pp. 59–61.

S. Sekiguchi et al., "Methods in Parallel Scientific Computation", Information Processing, vol. 27, No. 9, Sep. 1986, pp.985–993.

DeWitt et al., "Parallel Sorting on a Shared Nothing Architecture Using Probabilistic Splitting", 4–6 Dec. 1991, pp. 280–291, IEEE Comp. Soc. Press.

Haishoud, et al., "Critical Issues in the Design of a Fault--Tolerant Multiprocessor Database Server".

*Primary Examiner*—Thomas G. Black
*Assistant Examiner*—Jack M. Choules
*Attorney, Agent, or Firm*—Antonelli, Terry, Stout & Kraus

[57] ABSTRACT

A sorting method used with a distributed database having a plurality of first processors for holding partial records of a database that is divided into a plurality of portions and a host processor for accessing to each of the first processors. The method comprises the steps of: assigning a plurality of sections into which the distribution range of key values of records of the database is partitioned to a plurality of second processors in the first processors, and information for representing storage positions of the records to the second processors to which the sections of the key values, to which the records belong, are assigned; and sorting the plurality of key values, which have been received, in the second processors to produce key tables in which the information for representing the storage positions of the records which has been received is registrated together with the sorted key values, as the sorting result.

4 Claims, 13 Drawing Sheets

F I G. 3
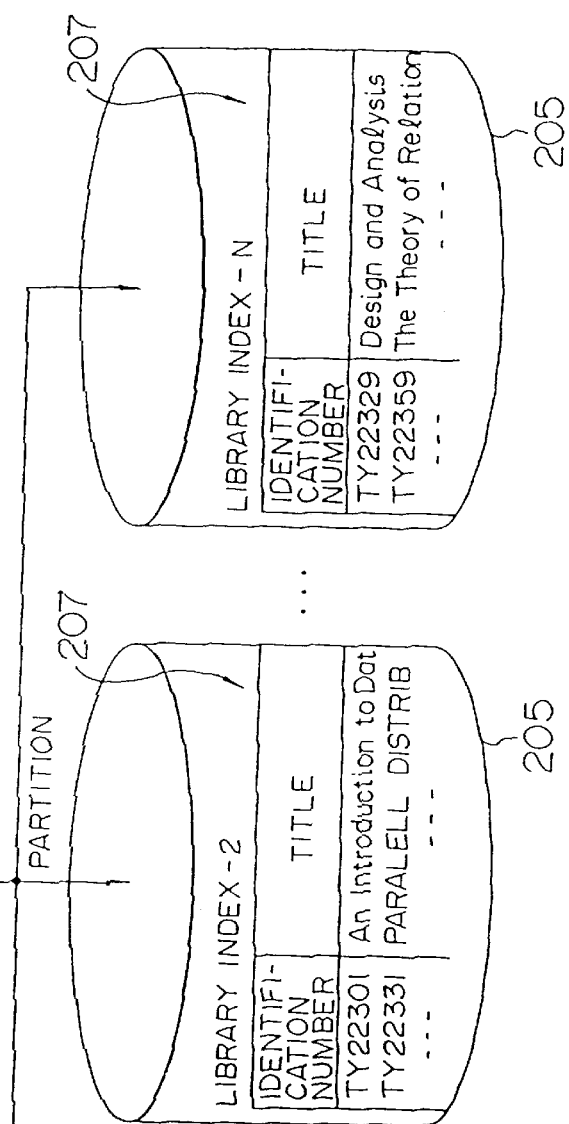

FIG. 5A

| KEY SECTION | THE NUMBER OF RECORDS |
|---|---|
| 0-99 | 2250 |
| 100-199 | 2530 |
| 200-299 | 2531 |
| 300-399 | 3560 |
| 400-499 | 2530 |
| ⋮ | ⋮ |

| KEY SECTION | THE NUMBER OF RECORDS | SINK PID | PARTITION POINT |
|---|---|---|---|
| 0-99 | 2250 | 1 | – |
| 100-199 | 2530 | 1 | – |
| 200-299 | 2531 | 2 | 248 |
| 300-399 | 3560 | 2 | – |
| 400-499 | 2530 | 3 | 440 |
| ⋮ | ⋮ | ⋮ | ⋮ |

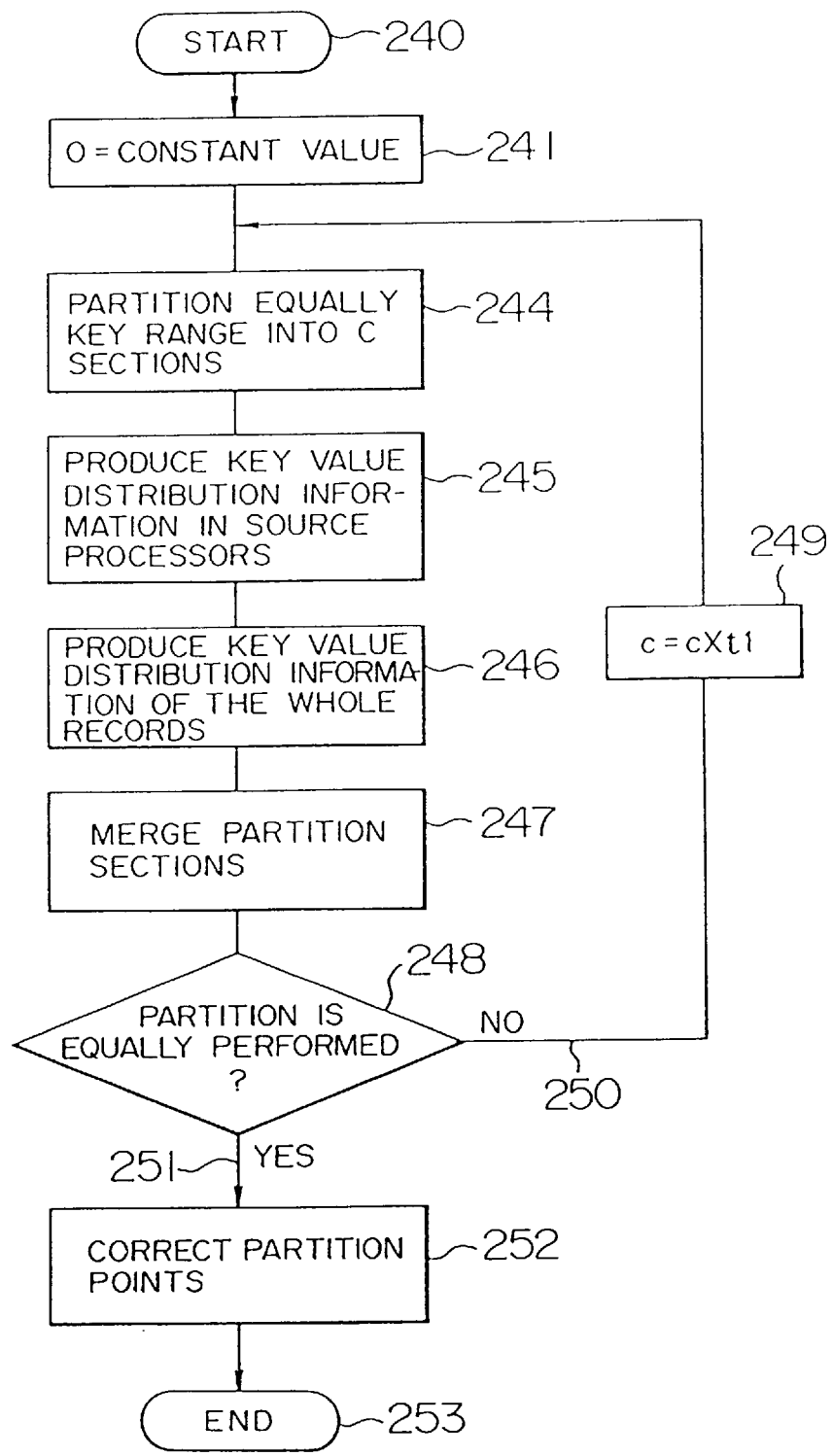

| SECTION NAME | KEY SECTION | FREQUENCY | SINK PID | PARTITION POINT |
|---|---|---|---|---|
| a0 | 0-99 | 2500 | 0 | - |
| a1 | 100-199 | 2800 | 1 | 138 |
| a2 | 200-299 | 1200 | 1 | - |
| a3 | 300-399 | 1900 | 2 | 334 |
| a4 | 400-499 | 1800 | 2 | - |
| a5 | 500-599 | 2900 | 3 | 518 |
| a6 | 600-699 | 1600 | 4 | 675 |
| a7 | 700-799 | 300 | 4 | - |
| a8 | 800-899 | 800 | 4 | - |
| a9 | 900-999 | 1300 | 4 | - |
| a10 | 1000-1099 | 1900 | 5 | 1041 |
| a11 | 1100-1199 | 1800 | 5 | - |
| a12 | 1200-1299 | 1400 | 6 | 1246 |
| a13 | 1300-1399 | 2100 | 6 | - |
| a14 | 1400-1499 | 2000 | 7 | 1436 |
| a15 | 1500-1599 | 2300 | 7 | - |

| MERGE SECTION | SINK PID |
|---|---|
| 0-137 | 0 |
| 138-333 | 1 |
| 334-517 | 2 |
| 518-674 | 3 |
| 675-1040 | 4 |
| 1041-1245 | 5 |
| 1246-1435 | 6 |
| 1436-1599 | 7 |

METHOD FOR STORING RECORDS OF A DISTRIBUTED DATABASE BY PLURAL PROCESSORS TO PROVIDE A HOST PROCESSOR WITH SORTED RECORDS BELONGING TO ONE OF A PLURALITY OF KEY SECTIONS

BACKGROUND OF THE INVENTION

The present invention relates to a method of sorting and accessing data stored in a plurality of storages used with a distributed database system in which records of the data are divided and stored in a plurality of storages.

As the technique of the parallel computer system has been developed, the distributed database system employing that technique has been put into practical use. The relational database is generally used in the distributed database system. The reason is that in the relational database, the management and processing of the data are carried out with a table called the data table as a unit, therefore the data is readily managed and distributed. Further, in recent years, the standard processing language called SQL is decided, and thus, it is considered that the relational database will come into more wide-spread use.

In the prior art distributed database system, the tables of the data which are managed by the system are stored distributively in the associated processors with a record as a unit. In that system, since one table is distributed to a plurality of processors, the processing such as retrieval of the data table can be carried out in parallel among the processors. Therefore, that system shortens the turnaround time of large scale processing. On the other hand, in that system, since one table is distributed to a plurality of processors, the plurality of processors need to cooperate with one another to perform processing such as sorting of whole tables and the matching of two tables.

As for the technique of sorting in the distributed database system, there have heretofore been disclosed various methods. The brief description will hereinbelow be given to the typical methods out of the various methods.

As a first method, there is known the method in which the sorting is performed in every processor with respect to the partial data stored distributively in the processors, and the results of the sort processing by the processors are collected in a host processor while being merged on the basis of the key values. Such a method is, for example, disclosed in JP-A-2-118756 corresponding to U.S. Pat. No. 4,412,285 etc.

Next, as a second method, there is known the method in which the key values are previously partitioned into a plurality of ranges in the host processor, and the data to be sorted is partitioned into a plurality of groups corresponding to the ranges of the key values thus partitioned so that the data of the groups is distributed to the different processors, and thereafter, the data of the groups is sorted in the associated processors, and the results of the sort processing in the processors are transferred to the host processor.

Moreover, in a third method, after the sorting is dependently carried out in the processors with respect to the partial data stored distributively in the processors, the result of the partial sort processing is partitioned every range of the key values to be distributed to the different processors. In this connection, only the key values of the records and the record identifiers are transferred to the processors and the body of the data is not transferred. Then, the merge processing of the key values distributed to the processors is performed every partial range, and on the basis of the result of the merge processing, the partial sort strings composed of the key values and the record identifiers are collected in sequence from the processors at the host processor. If this method is employed, there is no need to transfer the data body and the merge processing of the key values can be carried out in parallel in the processors.

The above second and third methods are, for example, disclosed in JP-A-2-228730. In those methods, the partition processing of the key values is performed in the host processor, the result of the partition processing is posted to the processors and the sort processing is performed every range of the key values assigned to the associated processors, therefore those methods are effective for carrying out the distributed sort processing in parallel. Moreover, by equalizing the amount of key values assigned to the processors, it is possible to promote the high speed operation of the sort processing itself.

In the above first method, the sorting result of the partial data stored distributively in the processors are collected in the host processor while being merged. Therefore, if the amount of data to be merged is large, the load of the processing put on the host computer is increased due to that merge.

On the other hand, according to the above second or third method, the sort processing can be carried out in parallel with the key values being distributed to the associates processors, and only the processing of collecting the sort results in the processors needs to be performed by the host processor. Therefore, as compared with the first method, the load put on the host processor is reduced.

However, in the above second method as ell, the partial sort strings produced by the processors need to be returned sequentially to the host processor. Therefore, if the amount of data to be processed is increased, the load required to return the processing result cannot be decreased.

On the other hand, in the above third method, the processing of returning the sort result is performed using the record identifiers corresponding to the data records to promote the reduction of the sequential processing. Therefore, the load required to return the processing result is small as compared with the above second method. However, there is a need for returning the identifiers that are proportional to the number of records to the host processor. Therefore, the load of the merge processing in the processors is increased along with the increase in the number of processors.

Accordingly, in the prior art sorting methods described above, even if the number of processors is increased in order to shorten the time required for the sort processing itself, the load is increased for the central processing unit, wherein the increased load is required for the merge processing accompanying the sort processing, as well as the processing of deciding the partition range of the key values. Thus, it is difficult to improve the whole processing time.

Moreover, in the distributed database system, when the sort result is accessed thereto using the key values, there are used the binary search method (refer to an article "Principle Of Database System" written by Ullman and translated by Kunii and Okubo) and the like. Accordingly, in the above-mentioned prior art methods, even when the specific section of the key values is accessed thereto, it is necessary to return all of the data stored in the processors to a user.

SUMMARY OF THE INVENTION

It is therefore an object of the present invention to provide a sorting method used with a distributed database system which is capable of effectively performing a sort processing by reducing a load put on a central processing unit.

In a method of sorting a distributed database according to the present invention, a distribution range of key values of entire records of table data making up a database is partitioned into a plurality of sections. The plurality of sections are respectively assigned to a plurality of first processors, and from a plurality of second processors, which hold partial data of the database, the key values of the records held by the second processors and information representing storage positions of the records are transferred to the first processors to which the sections having the key values belonging thereto are assigned. In the first processors, a plurality of key values which have been transferred from the second processors, respectively, are sorted, and a key table in which the key values thus sorted and the information representing the storage positions of the records are registered is produced as the sorting result.

Moreover, preferably, the second processors transfer the information representing the correspondence between the sections of the key values obtained by the partition and the first processors assigned to the sections to the host processor.

Further, in the method of sorting a distributed database according to the present invention, preferably, when the range of the keys of all of the records is partitioned into a plurality of sections, the range of the keys is partitioned equally into sections of having a number that is larger than the number of processors, and the plurality of sections obtained by the equal partitioning are merged into sections having a number which is equal to the number of processors in such a way that the numbers of records become equal to one another. To the plurality of sections thus merged, the processors which store the sorting results of the sections are respectively assigned. Moreover, during the partition and merge of the range of the key values, the accumulation/distribution of the information which is performed between the associated processors is carried out hierarchically.

According to the present invention, the sorting results are distributively stored in the plurality of processors, and the information which represents the correspondence between the sections of the key values obtained by the partition and the first processor assigned to the sections is transferred to the host processor, whereby there is no need for carrying out the merge processing in the host processor. As a result, a large reduction in the sort processing time can be realized. Moreover, the record data is not transferred to the host processor, and as a result, the amount of communication between the host processor and the database processing processor can be kept to a necessary minimum.

Further, according to the present invention, the range of the keys of the records is partitioned into a plurality of sections, and the number of records belonging to the sections are made equal to one another, whereby the equal load distribution among the processors can be realized. Moreover, the partitioning procedures are carried out in parallel in the processors, whereby it is possible to reduce the concentration of the load on the host processor accompanying the partition. Further, when such a partitioning processing is performed, the accumulation/distribution of the information among the processors is performed hierarchically, whereby it is possible to shorten the communication time required for the exchange of information.

BRIEF DESCRIPTION OF THE DRAWINGS

FIG. 3 is a view showing the situation of partition of a data table;

FIG. 5A is a diagram showing one example of key value distribution information;

FIG. 5B is a diagram showing one example of a key partition table;

FIG. 8 is a flow chart showing a procedure of a partition processing of a key range;

FIG. 11 is a diagram showing the key partition table produced by the partition processing of the key range;

FIG. 12 is a diagram showing a modification of the key partition table produced by the partition processing of the key range.

DESCRIPTION OF THE PREFERRED EMBODIMENTS

System Configuration and Flow of Processing

Figure 1:
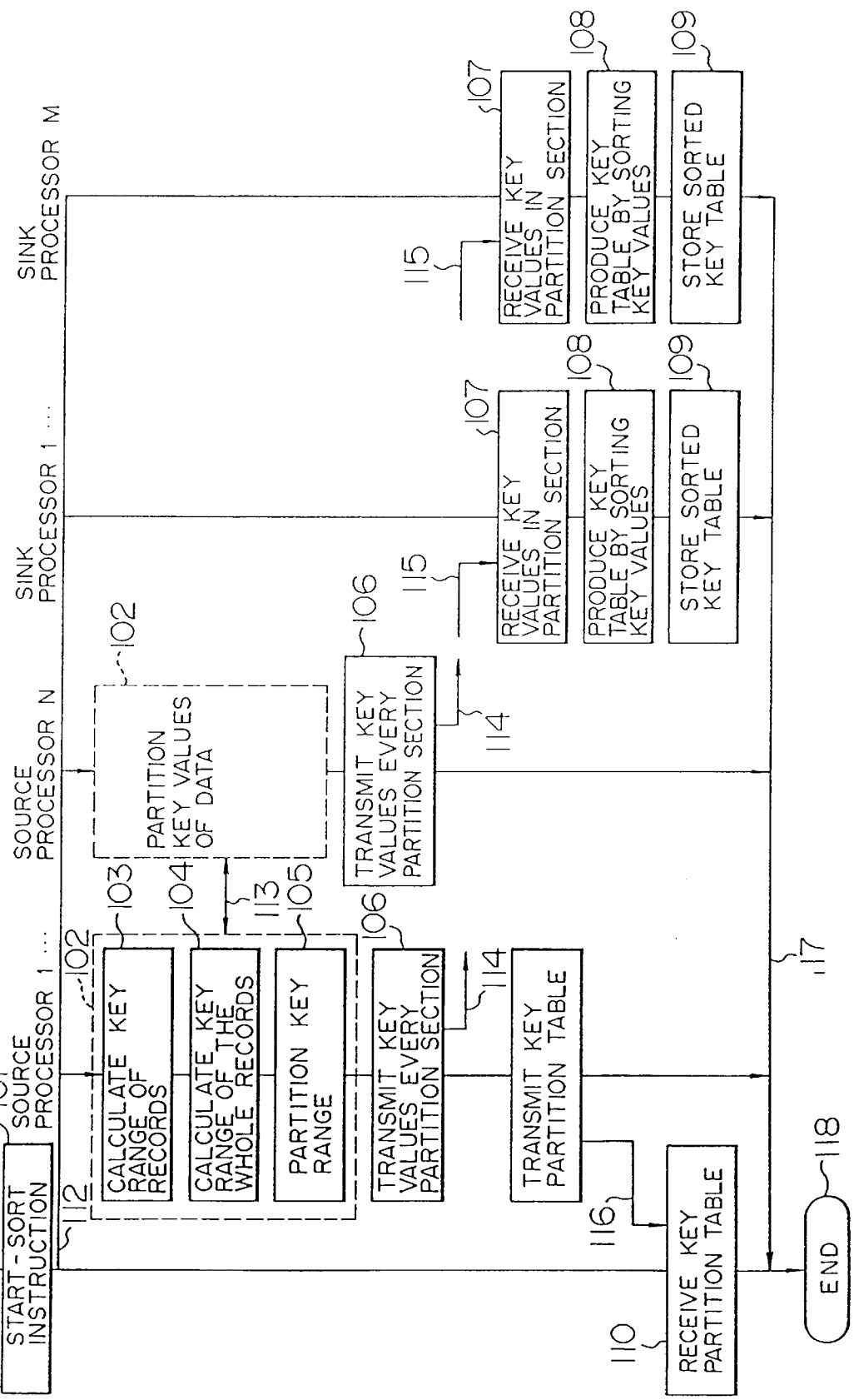
FIG. 1 is a flow chart showing a flow of a parallel sort processing according to one embodiment of the present invention.
Figure 2:
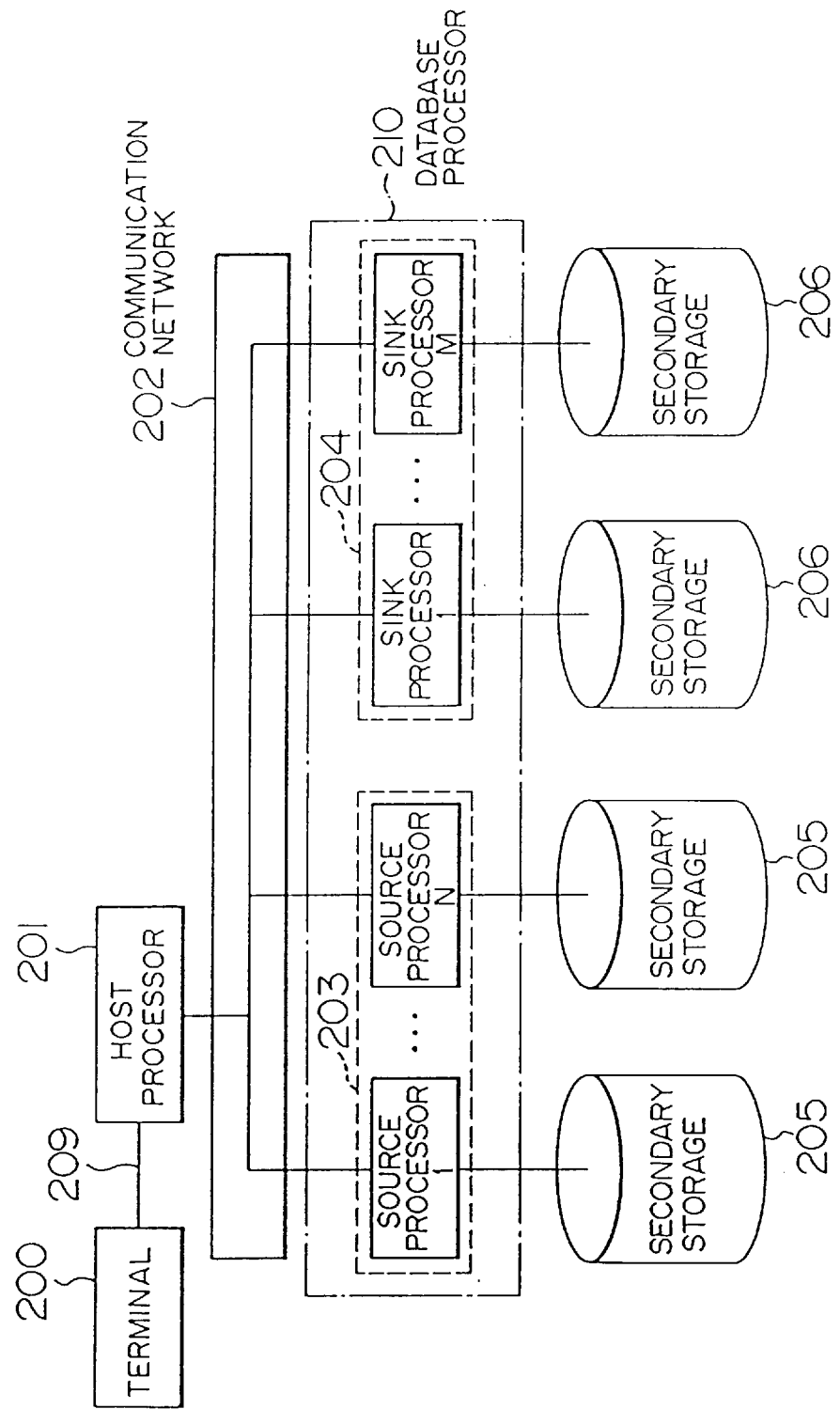
FIG. 2 is a schematic block diagram showing a configuration of a distributed database machine to which the present invention is applied.

FIG. 1 is a flow chart showing a flow of a parallel sort processing of one embodiment of a sorting method according to the present invention. FIG. 2 is a block diagram showing a configuration of a distributed database system to which the sorting method according to the present invention is suitable for being applied. The distributed database system shown in FIG. 2 includes a terminal 200 as an interface between the system and a user, a host processor 201 for analyzing a request of the user, which has been input through the interface 200, to issue an executable instruction, and a group of database processors 210. The group of database processors 210 are made up of N data processors (hereinafter referred to as "source processors") 203 to which secondary storages 205, such as magnetic disc units, for storing the data which is an object of the sort processing, are connected and M data processors (hereinafter referred to as "single processors") 204 to which secondary storages 206 for storing the results of the sort processing are connected.

In the present embodiment, the database processors and the secondary storages show one to one physical correspondence. However, one database processor may be physically provided with a plurality of secondary storages, or a plurality of database processors may have one secondary storage in common, as long as the database processors and the secondary storages show one to one logical correspondence.

Moreover, in FIG. 2, the source processors 203 and the sink processors 204 are shown to be independent of each other. However, the system may be designed in such a way that one processor is provided with a facility as the source processor 203 and a facility as the sink processor 204, and the facility of the sink processor 204 (or the source processor 203) is realized by a portion of, or the whole of, source processor 203 (or sink processor 204). The present embodiment will hereinbelow be described on the assumption that each of the database processors 203 and 204 has the facility that can be used as either the source processor or the sink processor.

The present system further includes a terminal link 209 for connecting the terminal 200 and the host processor 201, and a communication network 202 for connecting the host processor 201 and each of the database processors 203 and 204. For the communication network 202, various kinds of network such as a bus, a LAN, a hypercube, a butterfly switch, and a hyper crossbar may be available.

Incidentally, in the following description, the data is assumed to be stored in the secondary storages. However, it should be noted that the data may also be stored in the main storages of the database processors. In this case as well, the present invention can be applied in the very same manner.

In the present embodiment, table data making up the database (hereinafter, referred to as "a table" when applicable) is partitioned with the record as a unit and distributively stored in the form of small tables (hereinafter, referred to as "partial tables", when applicable) in the secondary storages 205 which are connected to a plurality of source processors 203. FIG. 3 is a view showing one example of the partition form of the table in the present system. In FIG. 3, as one example of the database, there is used a library index. A library index table 220 is partitioned with the record as a unit and distributively stored in the form of plural partial tables 207 in the N secondary storages 205. The number of records of the partial tables 207 of the library index which are stored in the respective storages 205, is about dn/N when the total number of records is dn.

Next, the brief description will be given to the whole processing procedure of the parallel sort processing in the present embodiment on referring to FIGS. 1 and 4.

The parallel sort procedure in the present embodiment is made up of four phases.

Figure 4A:
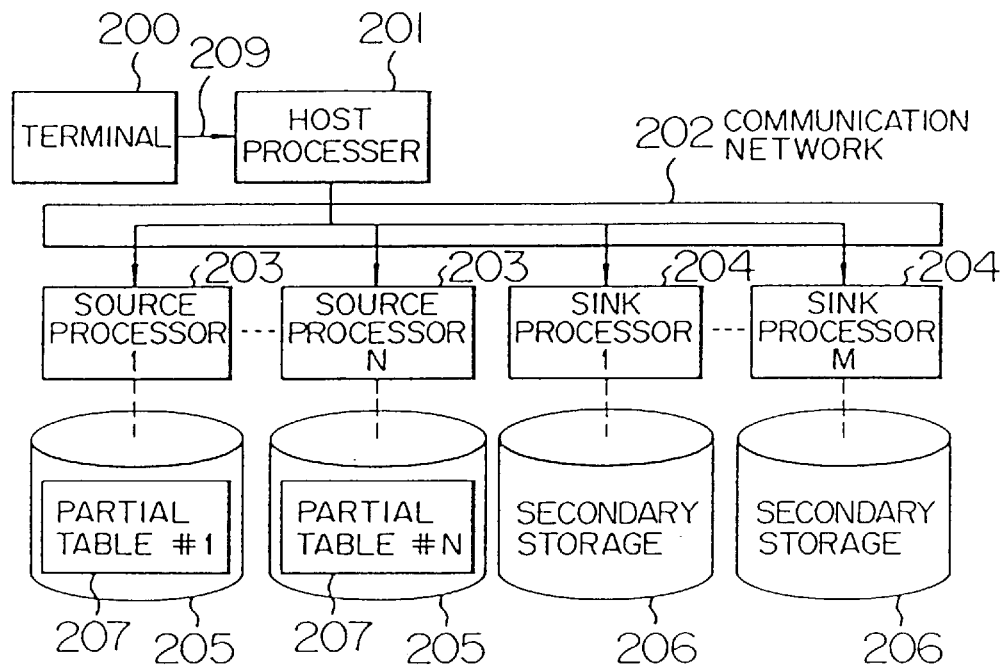
FIG. 4A is a schematic block diagram showing a flow of data in a phase 1 of the parallel sort processing according to one embodiment of the present invention.

In a first phase, the host processor 201 receives a request from the user through the terminal 200 and posts the START-SORT instruction to all of the source processors 203 having the partial tables, each of the partial tables being an object of the sort processing, and all of the sink processors 204 which are to store the sort results (Step 101 and Step 102). FIG. 4A is a flow chart showing a flow of the messages in the phase 1.

In a second phase, in the source processors #1 to #N which have received the START-SORT instruction, the range of the key values of all of the records is partitioned into a plurality of sections in such a way that the numbers of records belonging to the respective sections are approximately equal to one another (Step 102).

Figure 4B:
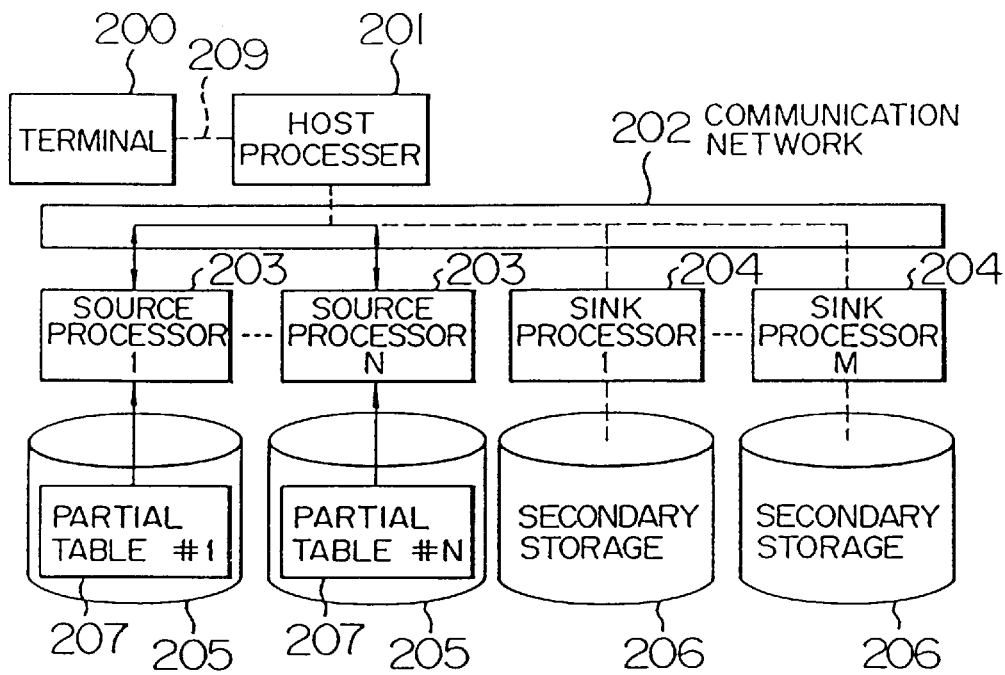
FIG. 4B is a schematic block diagram showing a flow of data in a phase 2 of the parallel sort processing according to one embodiment of the present invention.

In the present phase, first, the source processors 203 read out the partial tables from the corresponding secondary storages 205, and the range of the keys in the partial table which is held by each of the processors is calculated (Step 103). Subsequently, the source processors 203 communicate those results to one another (Step 113) to calculate the range of the keys of all of the records by the source processors (Step 104). Then, the resultant range of keys is finely partitioned into a plurality of sections and the number of records in the partial table which belongs to the associated section is counted to obtain distribution information of the key values. The resultant local distribution information of the key values is further exchanged among the source processors 203 to obtain the distribution information 300 of the key values of all of the records. Based on the global distribution information of the key values, the range of the keys is partitioned in such a way that the numbers of records which are assigned to the respective sink processors become approximately equal to one another (Step 105). FIG. 4B is a view showing a flow of the messages when the source processors 203 read out the partial tables 207 from the secondary storages 205 to exchange the distribution information of the key values among them.

The partition result which has been obtained by the above procedure is held in the form of key partition table 301 in the respective source processors 203. FIG. 5A is a diagram showing an example of an arrangement of key value distribution information 300 produced in each source processor 203, and FIG. 5B is a diagram showing an example of an arrangement of key partition table 211. The key value distribution information 300 is produced in the form of table which shows the key sections obtained by the partition and the numbers of records belonging to the respective key sections. Moreover, the key partition table 211 is a table wherein the key sections obtained by the partition are made to correspond to the associated sink processors 204 which take the processings about the key sections under their charge, and in the column of sink PID, numbers of the sink processors 204 which take the sort processings of the associated key sections under their charge are registered. In the present embodiment, in order to further reduce the dispersion of the amount of data which is to be processed by the sink processors 204, partition point information for partitioning one key section into two sub-sections is provided in the key partition table 211. In the key section in which the partition point information is registered, it is shown that the key values which are more than or equal to the value of the partition point are in the charge of the sink processor which was registered in the associated entry, and the records of which key values are less than the value of the partition point are in the charge of the sink processor 204 which was registered in the entry before that entry. For example, in FIG. 5B, it is shown that the key section "200–299" is partitioned into two sub-sections by the key value "248". Thus, it is shown that in the above key section, the sink processor #1 takes the records of values which are less than the key value "248" under its charge, and the sink processor #2 takes the records of values which are more than or equal to the key value "248" under its charge. In the entry in which the partition point information was not registered, the sink processor 204 which was registered in the column of the sink PID takes all of the records of the key section under its charge. Incidentally, the partition point information may not be necessarily provided. In this case, the boundary between the adjacent key sections becomes a boundary at which the range of the charge of the sink processor is changed.

Figure 4C:
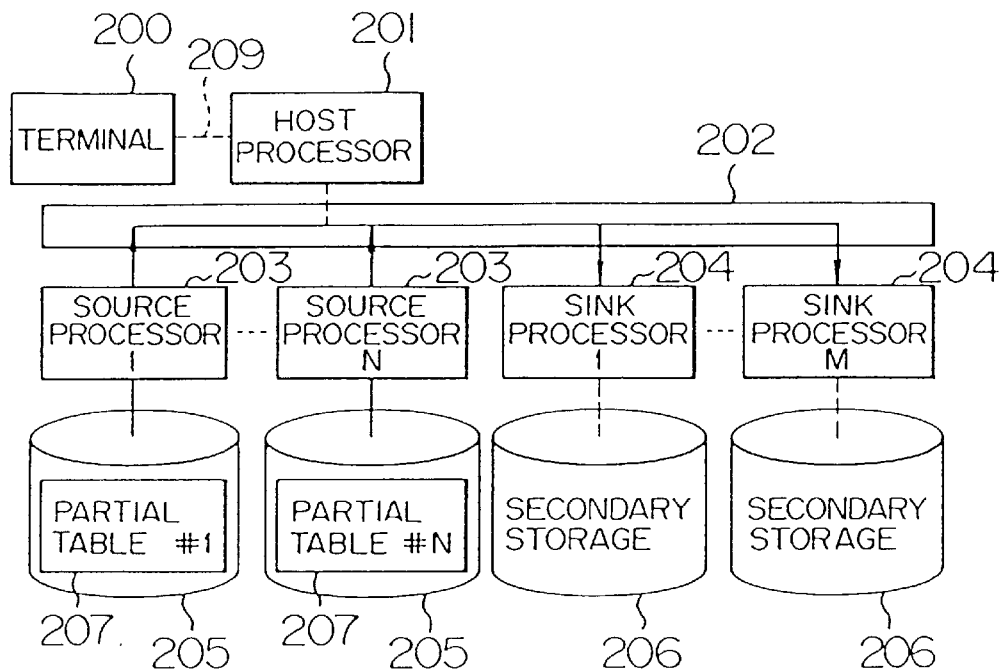
FIG. 4C is a schematic block diagram showing a flow of data in a phase 3 of the parallel sort processing according to one embodiment of the present invention.

In a third phase, each source processor 203 transmits a pair of a key value of each record of its partial table and a pointer to the record body to the sink processor 204 which takes the sort processing of the key value under its charge, while referring to the key partition table 211 produced in phase 2 (Steps 106, 114, 115 and 107). FIG. 4C is a view showing a flow of the data in the phase 3.

In a fourth phase, the key values and the record pointers which have been received by the sink processors 204 are sorted independently of one another. As the result of the sort processing, the key tables 212 are produced (Step 108) and then stored in the corresponding secondary storages 206 (Step 109). The ENDSORT messages from the sink processors 204 are hierarchically accumulated among the sink processors 204. For example, when the 8 sink processors are provided, first, the END-SORT messages from the sink processors #4 to #7 are transmitted to the sink processors #0 to #3. Subsequently, the END-SORT messages are transmitted from the sink processors #2 and #3 to the sink processors #0 and #1, and then, the ENDSORT message is transmitted from the sink processor #1 to the sink processor #0. Finally, the END-SORT message is transmitted from the sink processor #0 to the host processor (Step 117).

Figure 4D:
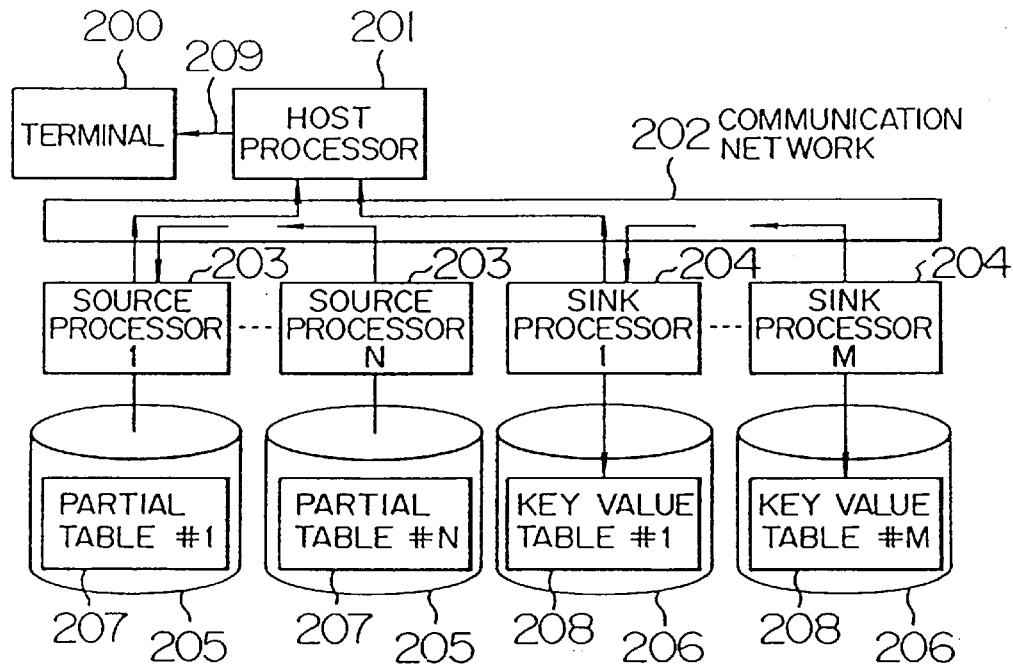
FIG. 4D is a schematic block diagram showing a flow of data in a phase 4 of the parallel sort processing according to one embodiment of the present invention.

On the other hand, the source processors 203, which have completed the transmission of the pairs of the key value and the record pointer to the associated sink processors 204, accumulate the end messages hierarchically in the same manner as in the sink processors 204. Finally, the source processor #0 transmits the key partition table 211 and the end message of the transfer processing to the host processor 201 (Step 116 and Step 117). The host processor 201 receives the key partition table 211 from the source processor 203 (Step 110) and then receives the end messages from the source processor 203 and the sink processor 204 to complete the sort processing (Step 118). FIG. 4D is a view showing a flow of the messages in the phase 4.

Figure 6:
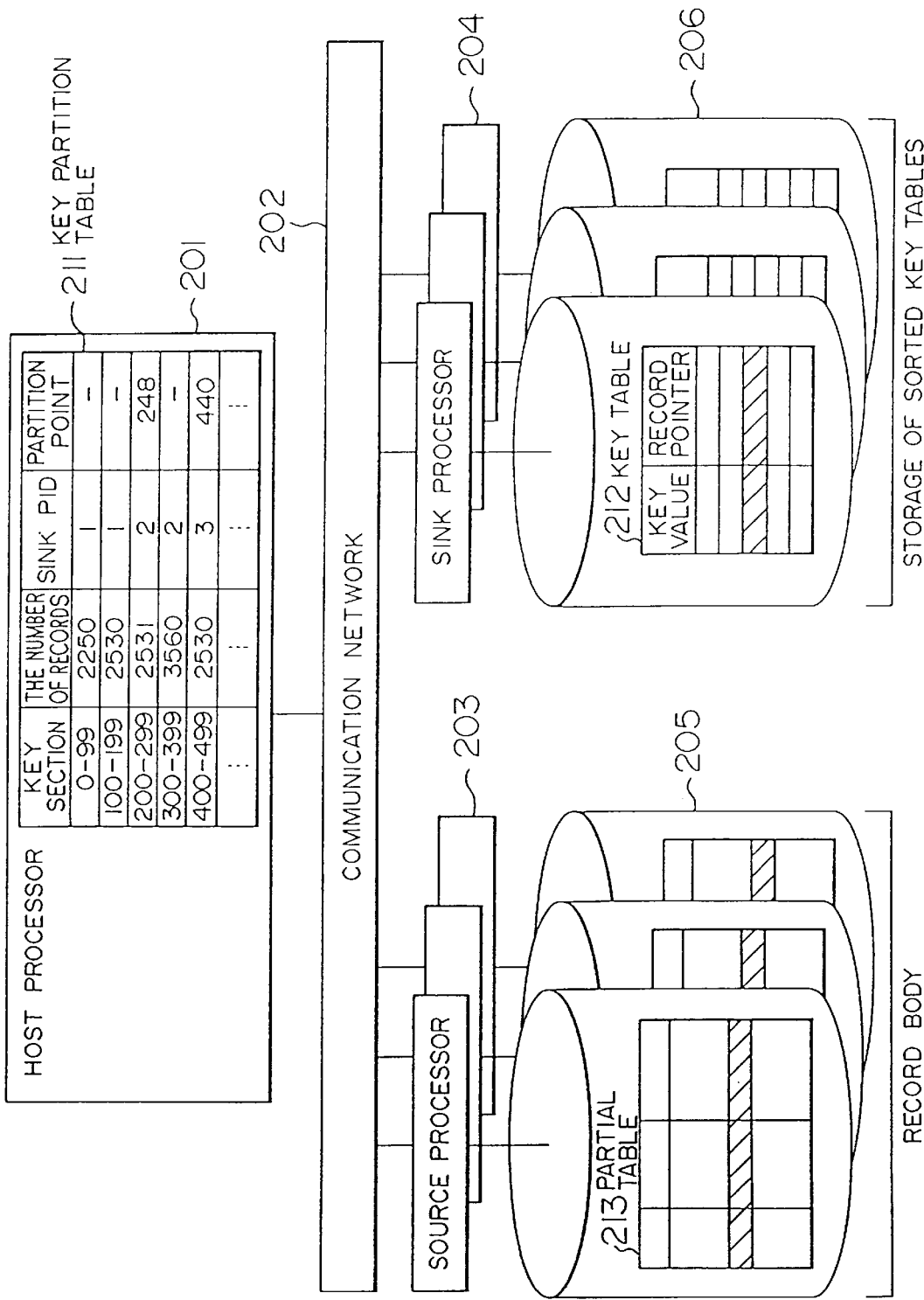
FIG. 6 is a block diagram showing the situation of information which is held by processors after completion of parallel sort processing.

FIG. 6 is a view showing the situation in which after completion of the above-mentioned sort processing, the information is held in the processors. The key partition table 211 which has been sent from the source processor 203 is held in the host processor 201. The partial tables 213 each of which is an object of the sort are held in the source processors 203, and the key tables 212 which were obtained by the sort processing are held in the sink processors 204. The access from the host processor 201 to the sorted tables is performed using the key partition table 211 and the key tables 212. The method of accessing the sorted tables will be described later.

Incidentally, in the sorting method according to the present embodiment, the transfer of the record body accompanying the sort processing is not performed at all. Therefore, the sort processing of the large amount of data can be effectively performed. Further, as the result of sorting, since the sorted key tables themselves and the record bodies are not returned to the host processor 201, it is possible to eliminate the sequential processing in the sort processing.

The above processing will hereinbelow be further described in detail.

Calculation of Range of all of the Data Records—Step 104

Figure 7:
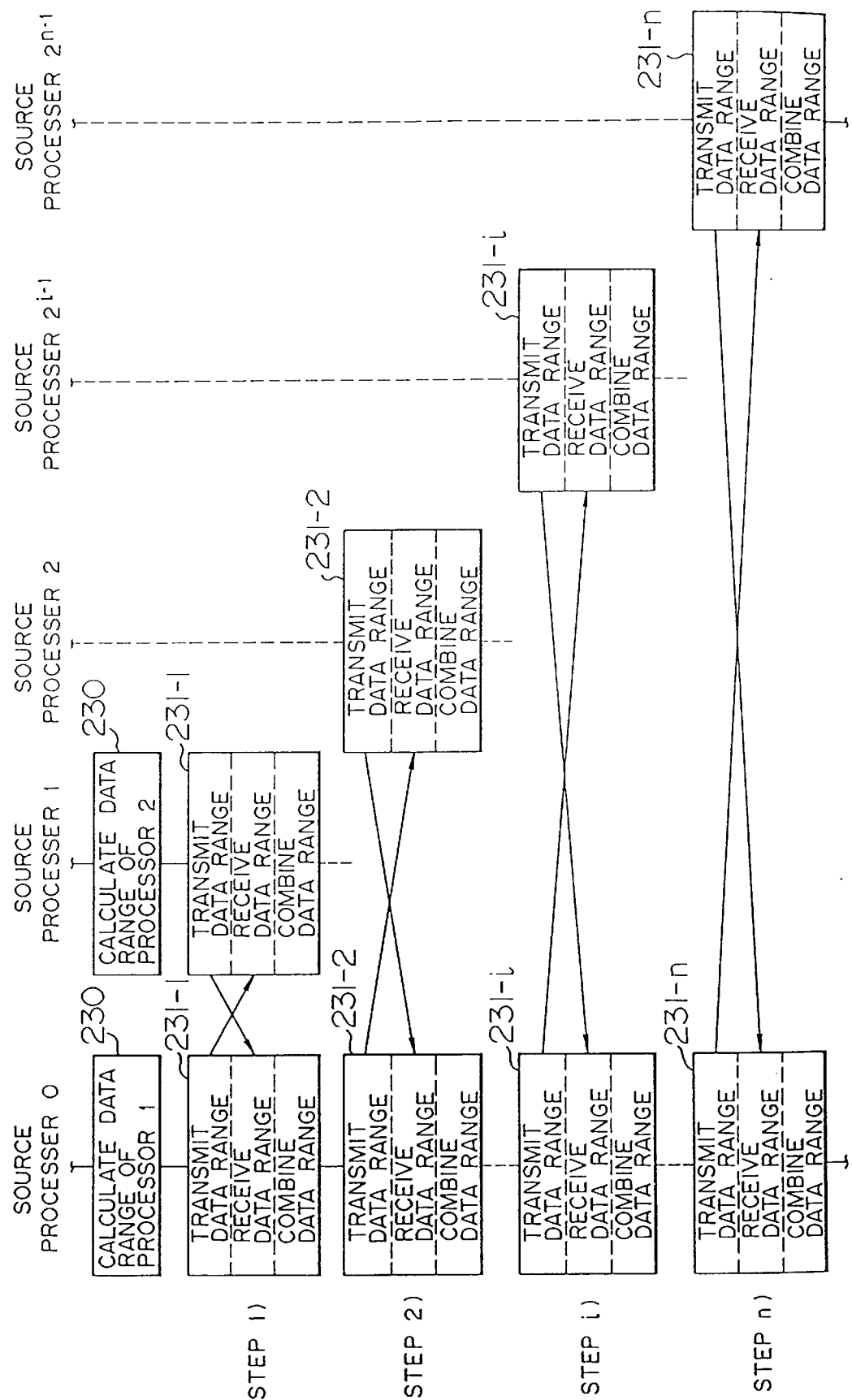
FIG. 7 is a view showing a detailed flow of range calculation of the whole records.

The cascade sum algorithm (it is well known in the art from the description in an article "Parallel Technology in Scientific and Technical Calculation" by Tomoji Sekiguchi and Yoshio Koyanagi, INFORMATION PROCESSING, Vol. 27, No. 9, pp. 985–994 (Sep. 1986)) can be applied to the calculation of the key range of all of the records. Now, the description will be given to the method of obtaining the key range using the cascade sum algorithm in referring to FIG. 7. In FIG. 7, the method of obtaining the calculation of all of the records by n communication procedures in the system including $(2 \wedge n)$ (the operator "$\wedge$" represents the exponentiation) source processors 203 is shown by paying attention to the source processor #0. It is assumed that the processor numbers are assigned logically to the source processors 203 in numerical order with 0 as a first number. Moreover, it is assumed in the following expressions that the processor number represents the logical processor number and that value is treated in the form of a binary number.

First, the key range of the records of the partial tables 213 which were held in the source processors 203 is calculated by the source processors 203 (Step 230). Then, all of the source processors 203 communicate with the their processor numbers) xor $(2 \wedge 0)$-th (where the operator "xor" represents the exclusive or) processors and exchange the resultant ranges to perform a join processing operation between the key ranges held by them and the received key ranges, to thereby obtain respective new key ranges (Step 231-1). For example, the source processor #0 and the source processor #1 exchange their ranges so that those ranges are combined, and as a result, the key range of the records which have been held in the source processors #0 and #1 is obtained. Similarly, in the subsequent Step 231-2 as well, all of the source processors communicate with the (their processor numbers) xor $(2 \wedge 1)$-th source processors and exchange the key ranges obtained in Step 231-1 so that those key ranges are combined. For example, the source processor #0 and the source processor #2 exchange their key ranges so that the key range held in the source processor #2 is supplied to the source processor #0. Thereafter, in i-th Step 231-i, all of the source processors and the (their processor numbers) xor $(2 \wedge (i-1))$-th source processors exchange their key ranges. Thus, all of the processors obtain the key range of all of the records through the n communication procedures.

One example of the key range when the 8 source processors are provided is shown in Table 1.

TABLE 1

| | | | | | | | | |
|---|---|---|---|---|---|---|---|---|
| Calculation Example of Key Range | | | | | | | | |
| Processor | Key Value | | First Step | | Second Step | | Third Step | |
| Number | Min | Max | Min | Max | Min | Max | Min | Max |
| 0 | 23 | 51 | 17 | 51 | 11 | 51 | 11 | 65 |
| 1 | 17 | 35 | 17 | 51 | 11 | 51 | 11 | 65 |
| 2 | 11 | 23 | 11 | 35 | 11 | 51 | 11 | 65 |
| 3 | 27 | 35 | 11 | 35 | 11 | 51 | 11 | 65 |
| 4 | 12 | 38 | 12 | 65 | 12 | 65 | 11 | 65 |
| 5 | 56 | 65 | 12 | 65 | 12 | 65 | 11 | 65 |
| 6 | 47 | 54 | 27 | 54 | 12 | 65 | 11 | 65 |
| 7 | 27 | 49 | 27 | 54 | 12 | 65 | 11 | 65 |

In the above example, it is assumed that the number of source processors is 2 to the n-th power. However, when the number of source processors, i.e., N is in the range of $2 \wedge (n-1) < N < 2 \wedge n$, the virtual source processors, which number $(2 \wedge n - N)$, are provided and the processings thereof are assigned to the real source processors 203, to thereby provide the source processors of which number is logically $(2 \wedge n)$. For example, the source processor $i (i < (2 \wedge n) - N)$ also performs the operation of the virtual source processor $(i+N)$. In this connection, it is assumed that the amount of data held in the virtual source processor is zero and the initial value of the key range is empty.

Section Partition of Key Range—Step 105

Next, the description will be given to Step 105 of partitioning the key range of all of the records into a plurality of key sections in such a way that the numbers of records belonging to the respective sections are equal to one another in referring to FIG. 8.

The partition of the key range is performed in the source processors 203 and is made up of a processing of equally partitioning the key range into a plurality of sections (a first Step of the key partition) and a processing of merging the key sections to assign them to the sink processors 204 and of equalizing the numbers of records to be assigned to the sink processors 204 (a second Step of the key partition).

In the first Step of the key partition, first, a suitable value is set to the number of partitions c of the key range. Then, the number of partitions c is more than or equal to the number of sink processors M for storing the sorting results. In the present embodiment, the number of partitions c is set to a value 2 times as large as M (Step 241). Next, the key range is equally partitioned on the basis of the number of partitions c set in Step 241 to obtain the c key sections. The equal partition points, each of which becomes the boundary between the adjacent key sections, are designated $a_0$, $a_1, \ldots a_c$ (Step 244). Next, the key values of the partial tables which are held by the source processors 203 are scanned, and the number of records belonging to each key section of the key range which was partitioned in Step 244 is counted to produce the local key value distribution information (Step 245). Subsequently, using the same method as for obtaining the key range of all of the records, the local key value distribution information which has been obtained in the source processors 203 is accumulated while being exchanged among the source processors 203, and finally, the source processors 203 obtain the distribution information of the key values of all of the records (Step 246).

In the second Step of the key partition, a plurality of key sections are merged to produce the merge sections which are equal in number to that of sink processors (Step 247). In this case, by referring to the key value distribution information of all of the records which was previously obtained, the merge is performed in such a way that the numbers of records of the merged sections become equal to one another as much as possible, and the sink processors 204 which will take the processings about the merge sections under their charge are determined. The specific description will hereinbelow be given to the processing when the number of partitions c is set to 16 to partition the key range, and those results are merged into 8 sections so that the 8 sink processors are assigned thereto.

Figure 9A:
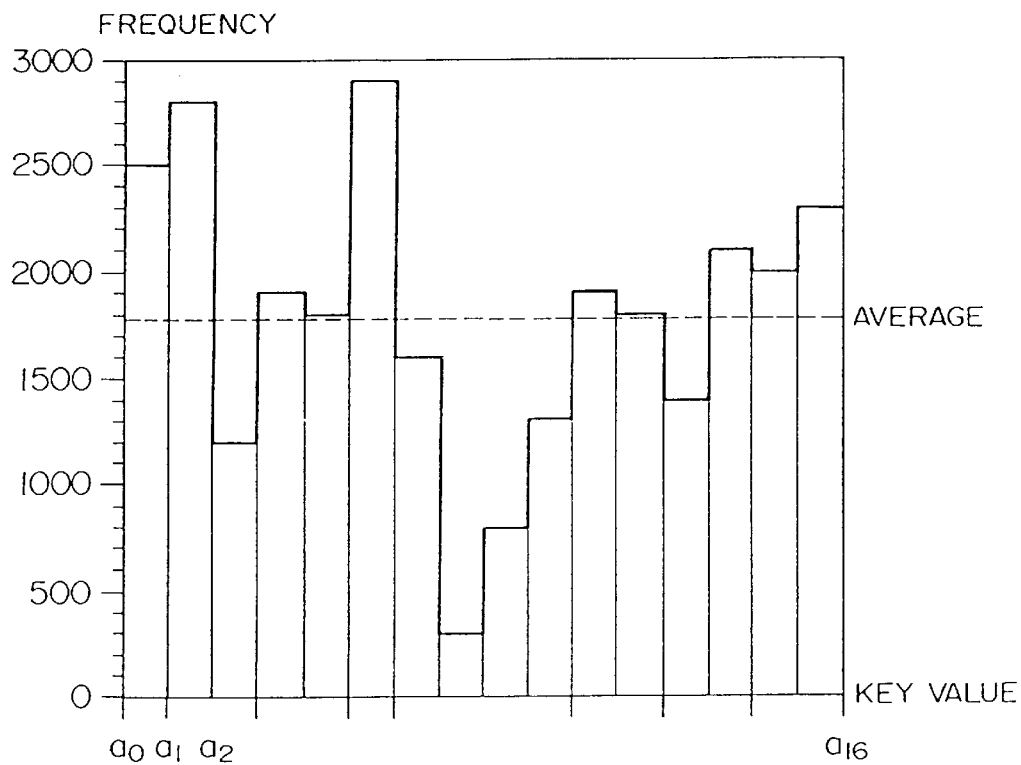
FIG. 9A is a graphical representation showing one example of distribution of key values of all of the records.
Figure 9B:
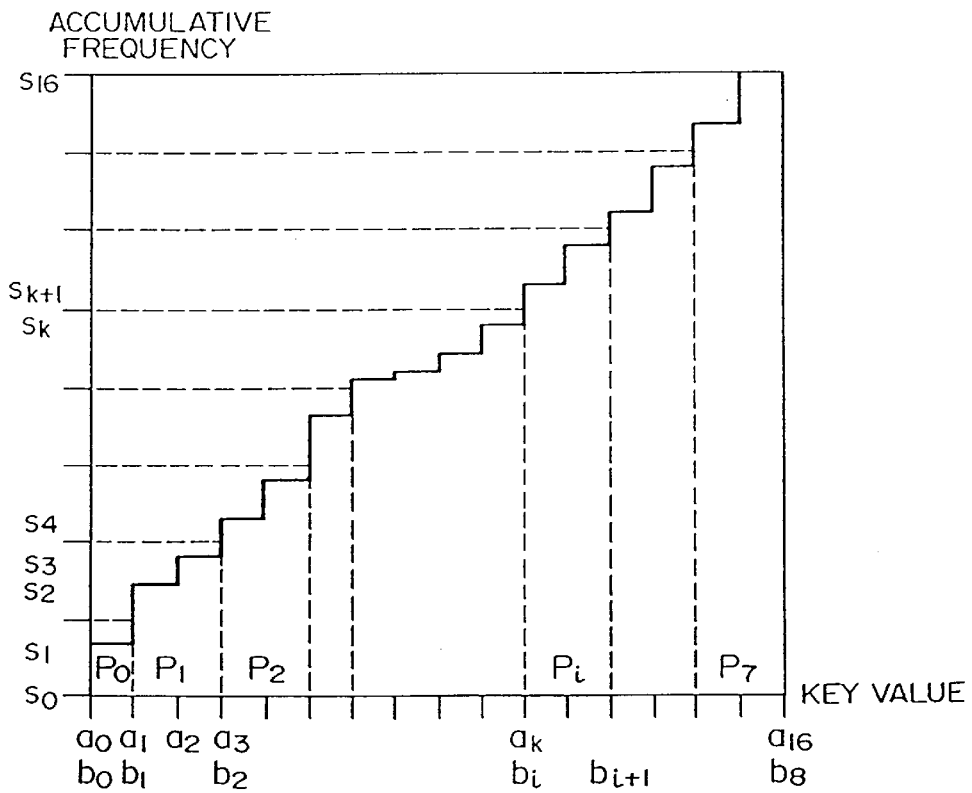
FIG. 9B is a graphical representation showing the situation of merge of the key sections.

Now, it is assumed that the key values of all of the records are found as the result of the first Step of the key partition to be distributed as shown in FIG. 9A. The axis of ordinate of the graph represents the number of records belonging to each key section and the axis of abscissa represents the key value. In the present figure, the key range is equally partitioned into 16 key sections. In general, if the key range is equally partitioned, as shown in FIG. 9A, the remarkable dispersion occurs in the numbers of records belonging to the corresponding sections. Then, the key sections are merged and the sink processors are assigned such that the numbers of records of the merge sections become equal to one another. FIG. 9B is a graphical representation useful in explaining a method of merging the sections to assign the resultant sections to the sink processors. The ordinate axis of the graph represents the cumulative frequency of the number of records belonging to each key section which was obtained in the first Step of the key partition and the abscissa axis represents the key sections which were obtained by the partition. The accumulative frequencies of the records belonging to the associated key sections are designated $s_0$, $s_1, \ldots s_{16}$ ($s_0$=0), and the values of the equal partition points obtained in the first Step of the key partition are designated $a_0$, $a_1, \ldots, a_{16}$ ($a_0$=MIN, $a_{16}$=MAX). Incidentally, the key section in which the key value is more than or equal to $a_i$ and less than $a_{i+1}$ is referred to as the key section $a_i$. In the second Step of the key partition, the 8 merge sections are provided which are assigned to the sink processors 204 by merging the 16 key sections which were obtained by the partition. The boundary $b_i$ between the adjacent merge sections (bo= MIN, $b_8$=MAX) is determined so as to be equal to the k-th equal partition point $a_k$ which fulfills the following relationships:

$S_{k+1} \geq$ (the total number of records)/(the number of processors)*i and $S_k <$ (the total number of records)/(the number of processors)*i The partition points among the merge sections thus determined $b_1$, $b_2$, $b_3$, $b_4$, $b_5$, $b_6$ and $b_7$ correspond to the equal partition points $a_1$, $a_3$, $a_5$, $a_6$, $a_{10}$, $a_{12}$ and $a_{14}$, in the present embodiment. Then, the record having the key value KEY which fulfills the relationship of $b_i \leq$ KEY $< b_{i+1}$ is assigned to the sink processor #Pi.

Next, it is judged whether or not the dispersion of the numbers of records assigned to the associated sink processors 204 is within the fixed tolerance Dh (Step 248). A value within ±40% of the average number of records is, for example, used as Dh. When the dispersion of the numbers of records of the merge sections is within the tolerance Dh, the processing of merging the key sections will be completed. In the meantime, when the dispersion of the numbers of records of the merge sections is not within the tolerance Dh, the number of partitions c is multiplied by t1 (Step 249) and then the key values are again partitioned. The degree of increase of the number of partitions c is determined on the basis of the maximum deviation of the number of records of each merge section. For example, when the maximum deviation from the average number of records x of each merge section is y, the increase rate t1 of the number of partitions c is set to;

$$t1 = 2 \wedge INT(2*(y/x+1))$$

where INT ( ) represents a function in which the figures below the decimal point are omitted, to thereby newly obtain the number of partitions c, and the range of the key range is again partitioned using the new number of partitions c.

Figure 10:
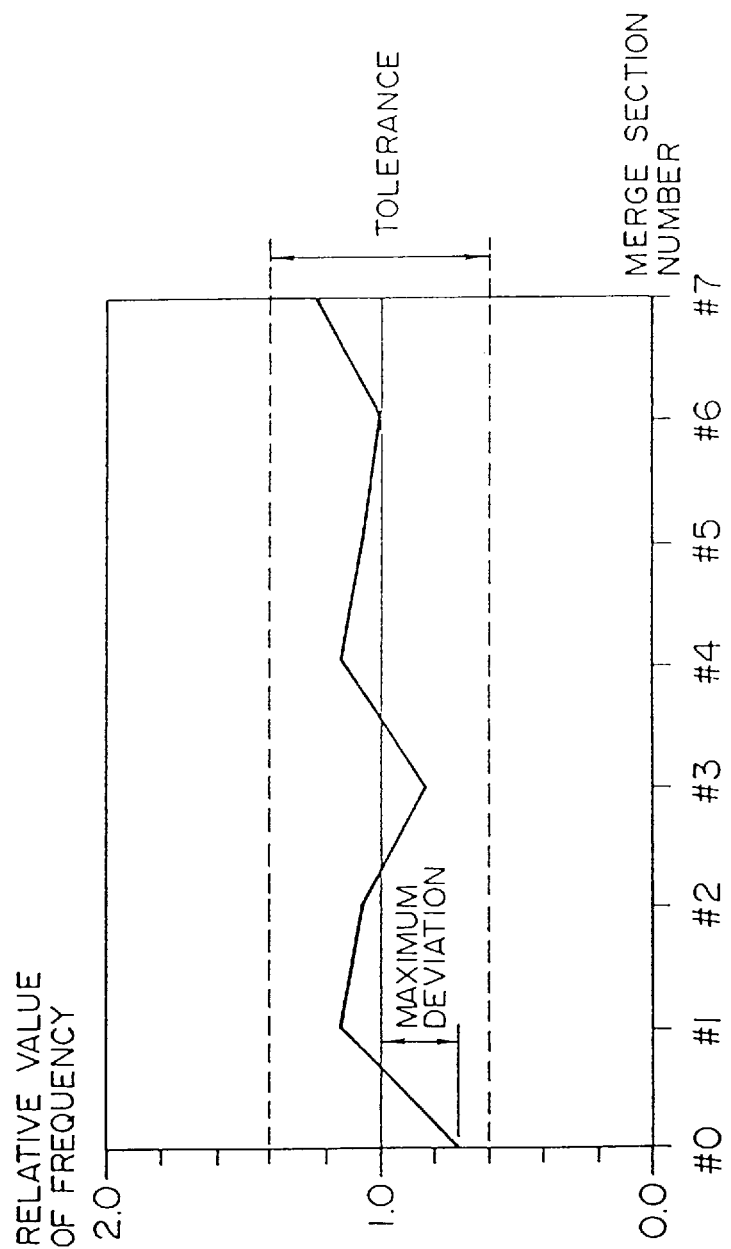
FIG. 10 is a graphical representation showing deviation of the number of record in merge sections after completion of the merge of the key sections.

FIG. 10 is a graphical representation in which the relative values of the numbers of records belonging to the associated merge sections assigned to the sink processors 204 are compared with one another when the number of partitions is set to 16 in the present embodiment. In the present figure, the average of the number of records of each merge section is assumed to be 1. From FIG. 10, it is found that the maximum deviation of the number of records is 30%, and the ratio of the maximum value of the number of records to the minimum value thereof is within 2.

After the merge sections are assigned to the sink processors 204 through the above procedures, in order to further equalize the numbers of records which will be processed by the sink processors 204, the partition point $b_i$ of the merge sections is corrected in the corresponding key section (Step 252). Assuming that the total number of records is Nr, the number of sink processors 204 is M, the width of each key section is w, the number of records $r_j$ in the key section $a_j$ to which the partition point $b_i$ of the merge sections belonging is $r_j$, and the cumulative frequency of the key values up to the equal partition point $a_{j-1}$ is $s_{s-1}$, the following relationship is established:

$$b_i=a_j+w(Nr/Mxi-s_{j-1})/r_j$$

On the basis of the above expression, the partition point $b_i$ of the merge sections after the correction is obtained. Thus, the key values of the resultant partition points after the correction $b_1, b_2, \ldots, b_7$ becomes 138, 334, 518, 675, 1041, 1246 and 1436, respectively.

The information of the key sections, the number of records every key section, the numbers of the sink processors taking the key sections under their charge, and the partition points, which have all been obtained through the above procedures, are produced in the form of key partition table 211-a shown in FIG. 11. When the correction of the partition points is not performed, the key partition table which have the key sections and the sink processor numbers as the entries may be produced. The key partition table is constructed in such a manner, whereby the sink processor 204 assigned to the key section to which a certain key value belongs can be retrieved at high speed.

FIG. 12 is a diagram showing another example of the key partition table. The key partition table 211-b shown in FIG. 12 has the merge sections and the numbers of the sink processors taking the processing of the records of the merge sections under their charge as the entries. Since the merge sections are not obtained through the equal partition, when such a key partition table is used, in order to obtain which of the merge sections a certain key table belongs to, it is necessary to employ the binary search method. But, in the present example, there is provided an advantage in that the number of entries of the key partition table does not need to exceed that of the key partition table shown in FIG. 11.

Incidentally, with the partition of the key values in the second and subsequent sort processings for the same table, by using the number of partitions c, which was used at the last time, as the initial value, the processing of the partition of the key values can be performed at high speed. Moreover, in the case where the key field of the table is not changed, by using the key partition table which was obtained at the last time, it is also possible to omit the processing of partitioning the key values in the sort processing. In this case, the key partition table which is produced through the sort processing may be stored as the attribute of the table separately from the sorting result.

Transfer and Reception of Key Values Every Partition Section—Step 106 and Step 107

Figure 13:
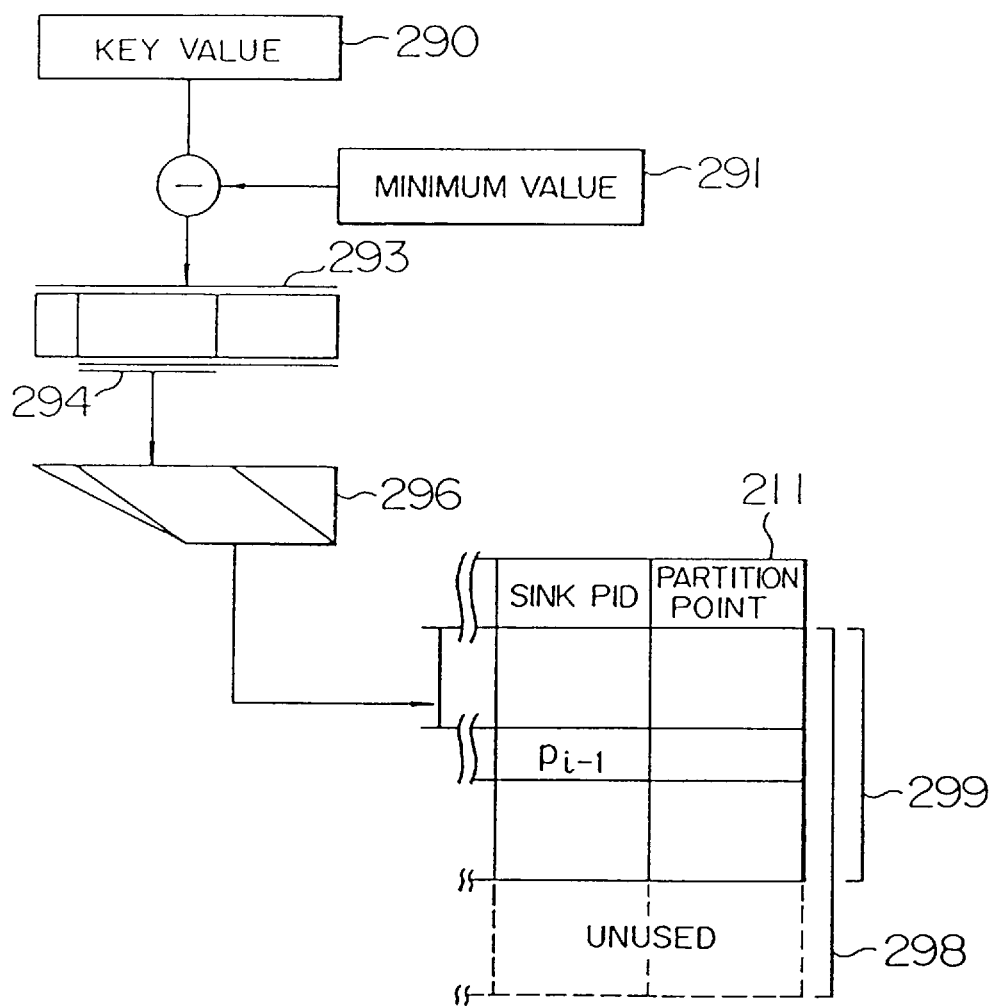
FIG. 13 is a flow chart showing an access processing of the key partition table.

In Step 106, the Ikey value of each record of the partial table held in each source processor 202, and the record pointer for representing the storage position of the record body are transferred to the sink processor 204 which takes the processing of that key value under its charge, in referring to the key partition table 211 which has been produced through the above-mentioned procedures. Then, the entry to which the key partition table 211 corresponds is retrieved on the basis of the key value, to thereby obtain the number of the sink processor 204 to which both the key value and the record pointer are to be transferred. The description will be given to the procedure of citing, on the basis of an arbitrary key value, the corresponding entry in the key partition table in referring to FIG. 13. Then, it is assumed that the difference between the maximum value of the key value and the minimum value thereof has k bits at most, and the key value i.s 1 bit. For example, if the key value is an integral number of 2 bits and in the range of 1000 to 8999, k is 13 bits and 1 is 16 bits. First, a difference 293 between a key value 290 and the minimum value of the key value 291 is obtained. The difference 293 is referred to as the relative key value. The bit number of the relative key value is k bits. Next, out of the k bits of the relative key value, the high order p bits are obtained as the partition bit 294 from the shift calculation (Step 296). If the number of partitions c of the key range is given, p is obtained from the following expression;

$$p=[\log_2 c]$$

where [x] represents the maximum integral number which does not exceed x. The value of the partition bit 294 thus obtained is used as the index of the key partition table 211, to thereby access the entry which corresponds to the section to which the record of interest belongs. Thus, by accessing the entry corresponding to the key value, the access to the entry corresponding to an arbitrary key value can be realized by one subtraction, one shift calculation and the reference of the table using one index. Further, the present procedure is put into the hardware in accordance with FIG. 13, whereby the improvement in the processing efficiency can be realized. Moreover, the number of real partitions PN of the key range is expressed by the following relationship.

$$PN=INT((\text{maximum value}-\text{minimum value})/2^{\wedge}(k-p))+1$$

If the partition bit is generally p, the number of real partitions PN of the sections of the key values varies depending on the maximum value of the key value and the minimum value thereof, and its range is expressed by the following relationship.

$$2^{\wedge}(p-1)<PN\leq 2^{\wedge}p$$

Therefore, the key partition table employs only the high order PN entries out of the table 298 composed of the entries of $2^{\wedge}p$, as the real table 299.

Next, the procedure of referring to the key table will be shown using the above example. If the number of partitions is 256 in the above example, the partition bit p is 8 bits and the width of each section is 32. Therefore, the range of keys from 1000 to 8999 can be equally partitioned into 250 sections. Some difference may be generated between the number of partitions c of the key values and the actual number of partition sections in some cases. However, this does not influence the method of partitioning the key values based on the present method, at all. In the above example, in order to refer to the entry of the key partition table corresponding to the key value 5000, first, the minimum value of the key value 1000 is subtracted from the key value 5000. Since the resultant value 4000 is (0111111000000) in the form of 13 binary digits, if the high order 8 bits are selected, the resultant value is 126 in the form of decimal number. Then, the 126-th entry of the key partition table is referenced to obtain the number of the sink processor which takes the section of interest under its charge, and a pair of key value 5000 and record pointer corresponding to that key value are transferred to the associated sink processor.

Such a method can be applied to the case where the width of the partition section of the key values is expressed by 2 to the n-th power. When the width of the partition section of the key values is not 2 to the n-th power, the entry of the key partition table is referenced using the quotient which is obtained by dividing the difference between the key value and the minimum value of the key value by the width of the partition section as the index. Moreover, in the case where the key partition table is expressed by a pair of merge section and number of the sink processor as shown in FIG. 12, as described above, the merge section corresponding to the key value is retrieved using the binary search.

Access of Data Using Partition Table

Next, the description will be given for the procedure of accessing to the result, which is obtained by the sorting according to the present embodiment, using the host processor 201.

As described above, FIG. 6 is a view showing the situation of the information which is held in the processors after completion of the sort processing. The partial tables 213 are held in the secondary storages 205 connected to the source processors 203, the key tables 212 as the sorting results are held in the secondary storages 206 connected to the sink processor 204, and the key partition table 211 which was produced by the sort processing is held in the host processor 201.

Basically, the access to the record of the sorting result is carried out by referring to two kind tables of key partition table 211 and the sorted key table 212.

As the form of utilization of the sorting result in the host processor 201, there are considered the following cases; (1) to specify the order of the key values to perform the access, (2) to specify the key value to perform the access, and (3) to compare the two sorted data held in the associated source processors with each other to perform the join operation. In the following paragraph, the procedure of access of the data will be described with respect to the above cases (1) to (3).

(1) Case Where the a-th Record from the Head of the Key Values is Accessed

The number of records is accumulated over the sections of the key partition table 211 which is held in the host processor 201 to obtain the cumulative frequencies $s_1, S_2, \ldots, s_n$. Next, the cumulative frequencies from the head to the individual key sections $s_1, s_2, \ldots, s_n$ are compared with a in sequence to obtain i which fulfills the relationship of $s_i \leq a < s_{i+1}$, to thereby obtain the sink processor #Pi which holds the records of the corresponding section. Then, the pointer to the record body is obtained by referring to the $(a-s_i)$-th entry of the sorted key table 212 which is held in the sink processor #Pi. Then, by using that record pointer, the corresponding record of the partial table 213 of the source processor 203 holding the record body is accessed.

(2) Case Where the Record in Which the Key Value k is Retrieved

In the same manner as in the transfer processing in Step 106 of the sort processing. On the basis of the key value, the corresponding entry of the key partition table is retrieved to obtain the number of the sink processor 204 to which the section having that key value belonging thereto was assigned. After the number of the sink processor 204 has been obtained, the key table 212 of the corresponding sink processor is retrieved, and then, on the basis of the entry corresponding to that key value, the record pointer for representing the storage location in which the record corresponding to that key value is to be stored is obtained. Then, by using that record pointer, the corresponding record of the partial table 213 of the source processor 203 holding the record body is accessed.

(3) Case Where Two Tables are Compared with Each Other to Perform the Join Operation With respect to the individual tables which are to be compared with each other, first, the sort processing is performed. As the result of the sort processing, the partial tables as the bodies of the tables are held in a plurality of source processors 203, and the corresponding key tables are held in a plurality of sink processors 204. When the key values of the two sorted tables A and B are compared with one another, the entries of the key table of the table A are transferred to the sink processor 204 which is assigned by the key partition table of the table B.

Next, the comparison processing of performing the comparison of the key tables of two tables using the respective sink processors 204 is carried out by referring to only the key values of the tables. The comparison result is stored, in the form of combination table composed of pairs of a key value successful in comparison and a pointer to the records, in the sink processors 204, and only the end message is posted to the host processor 201. The key partition table used for accessing to the entries of that combination table is the same as that of the table B.

Other Embodiments

The above-mentioned embodiment is designed in such a way that after the range of the keys is partitioned, only the key values and the record pointers of the records are transferred to the sink processors. However, in the transfer operation, all of the records may be transferred to the sink processors. In this case, although there is provided a disadvantage in that the record body to be sorted needs to be moved to the sink processor 204, since the source processors 203 distribute the records to the suitable sink processors, the overhead for the distribution of the records can be reduced as compared with the case where one processor, e.g., the host processor 201 performs the distribution. Moreover, since the source processors 203 carried out the respective processing of partitioning the key values independently of one another, the load becomes small as compared with the case where that judgement is concentratively performed in the host processor 201.

Further, in the above embodiment, during execution of the sort, the key values are transmitted from the source processors 203 to the sink processors 204. In this connection, with respect to that method, following two methods are further considered in correspondence to the form of storage of the sorting result.

In a first method, on the basis of the key tables 212 which have been sorted by the sink processors 204, the record bodies to which the key values belonging to the key table of interest 212 corresponds are transferred from the source processor holding those record bodies to the corresponding sink processor 204, and that result is stored in the secondary storage 206 connected to that sink processor 204. As a result, since the record bodies belonging to the partial sections of the key values are stored in the same secondary storage, high efficiency is obtained when the record data of the sorting result is successively accessed in the order of the key values. Therefore, this is effective when the statistical calculation is given to a certain section of the sorting result.

In a second method, the key tables 212 which have been sorted by the sink processors 204 are transmitted to the host processor 201, and a group of key tables 212 of all of the records are managed by the host processor. In the present method, in the case where the host processor 201 successively accesses the data of the sorting results, the secondary storage 205 to any one source processor 203 can be directly accessed thereto for that data, circumventing the sink processor 204. Therefore, the present method is very effective in the case where the sorting results are transmitted to the terminal 200 or an external storage (not shown) through the host processor 201.

As set forth hereinabove, according to the present invention, only the key partition table which was produced in the intermediate stage of the sort processing is returned to the host processor, and the sorting results themselves are distributively stored in a plurality of secondary storages every section of the key values, whereby is possible to improve the efficiency of the sort processing in the distributed database system.

Moreover, since the partition of the key range in the distributed sort can be carried out in parallel by the processors, it is possible to reduce the load put on the host processor.

Further, by referring to the key partition table, it is possible to effectively obtain the section to which a given key belongs.

We claim:

1. A method for determining a key distribution range of records of a distributed database system, executable on a computer system comprised of a plurality of processors and a host processor connected thereto, wherein records of a database are held by said plurality of processors, said method comprising the steps of:

(a) determining by each of said plurality of processors, a local key distribution range of key values of records held by said each processor;

(b) exchanging among different ones of said plurality of processors, the local key distribution range determined thereby;

(c) combining in each of said plurality of processor, the local key distribution range determined thereby with at least one local key distribution range given by at least one other processor within said plurality of processors by the exchanging step, to generate a combined key distribution range of a key distribution range for key values of records held in said each processor and a key distribution range for key values of records held in said at least one other processor; and (d) repeating the steps (b) and (c) until each of said plurality of processors generates a global key distribution range of key values of records held in said plurality of processors, wherein at each repetition of the step (b) each of the plurality of processors exchanges one combined key distribution range generated thereby by preceding execution of the steps (b) and (c) with another of said plurality of processors which has generated another combined distribution range which includes information which has not yet been reflected to the one key distribution range.

2. A sorting method for a distributed database system, executable on a computer system comprised of a plurality of processors and a host processor connected thereto, wherein records of a database are held by a first group of processors included in the plurality of processors, said method comprising the steps of:

assigning different key sections within a key distribution range to a second group of processors included in the plurality of processors, in response to a sort request from said host processor, wherein said key distribution range includes a range of key values within the records of said database with;

transferring a key value for each record held by each processor of said first group of processors and a record pointer indicative of a storage location of said each record to one processor of said second group of processors which has been assigned one of said different key sections to which said key value belongs;

sorting, in each processor of said second group of processors, key values received therein from said first group of processors and producing, as a result of said sorting, local key value information for a key section assigned to said each processor of said second group of processors, said local key value information including sorted key values belonging to said one key section and record pointers received together with said sorted key values;

informing said host processor of key partition information indicative of a relation between each of said different key sections and corresponding processors of said second group of processors which has been assigned to said each key section in said assigning step;

storing said key partition information in said host processor as a first result of said sort request; and storing said local key value information generated in each processor of said second group of processors there within as a second result of said sort request so as to be used in combination with said key partition information stored in said host processor when said records of said database are to be accessed according to an order of the key values of said one keys;

wherein said assigning step comprises the steps of:

determining by each of said first group of processors, a key distribution range of key values within the records of said first group of processors, dividing by each of said first group of processors, the key distribution range into a plurality of key sections, obtaining by each of said first group of processors, the local distribution information of key values within the records of said first group of processors, exchanging said local distribution information of key values among the source processors to obtain the global distribution information of key values of the table, and assigning by each of said first group of processors, the different key sections to a second group of processors, on the basis of said global key distribution information of key values.

3. A database access method according to claim 2, further comprising the steps of:

selecting in said host computer based upon said key partition information, at least one processor of said second group of processors which has been assigned with at least one of said different key sections, wherein said at least one key section indicates a range of key values which correspond to records to be read;

requesting, in said host processor, the selected at least one processor of said second group of processors to read out records having key values belonging to said at least one key section; and sequentially providing different ones of the first group of processors with read requests for records whose record pointers are included in the local key value information stored in the selected at least one processor from said selected at least one processor of said second group of processors, in response to the request by said host processor and based upon record pointers, so that those records are supplied to said host processor according to an order of said sorted key values held in said local key value information.

4. A sorting method for a distributed database system executable on a computer system comprised of a plurality of processors and a host processor connected thereto, wherein records of a database are held by a first group of processors included in the plurality of processors, said method comprising the steps of:

assigning different key sections within a key distribution range to a second group of processors included in the plurality of processors, in response to a sort request from said host processor, wherein said key distribution range includes a range of key values within the records of said database;

transferring a key value for each record held by each processor of said first group of processors and a record pointer indicative of a storage location of said each record to one processor of said second group of processors which has been assigned one of said different key sections to which said key value belongs;

sorting, in each processor of said second group of processors, key values received therein from said first group of processors and producing, as a result of said sorting, local key value information for a key section assigned to said each processor of said second group of processors, said local key value information including sorted key values belonging to said one key section and record pointers received together with said sorted key values;

informing said host processor of key partition information indicative of a relation between each of said different key sections and corresponding processors of said second group of processors which has been assigned to said each key section in said assigning step;

storing said key partition information in said host processor as a first result of said sort request;

storing said local key value information generated in each processor of said second group of processors there within as a second result of said sort request so as to be used in combination with said key partition information stored in said host processor when said records of said database are to be accessed according to an order of the key values of said one key;

determining by at least one of said first group of processors, in response to the sort request, a key distribution range of key values within the records of said first group of processors; and dividing the key distribution range into a plurality of key sections;

wherein the determining step comprises the steps of:

determining, by each of said first group of processors, a local key distribution range of key values records held by said each processor with respect to one of plural keys predetermined for the records of said database, exchanging among different ones of said first group of processors, the local key distribution range determined thereby, combining in each of said first group of processors, the local key distribution range determined thereby with at least one local key distribution range given by at least one other processor by the exchanging step to generate renewed key distribution range indicative of combined key distribution range of key values of records held in said each processor and in said at least one other processor, and repeating the exchanging step and the combining step so that each of said first group of processors generates a combined key distribution range of key values of records held in said first group of processors, wherein each of said first group of processors changes a processor with which a local key distribution range is to be exchanged, at each repetition of the exchanging step.

* * * * *